UNITED STATES PATENT OFFICE.

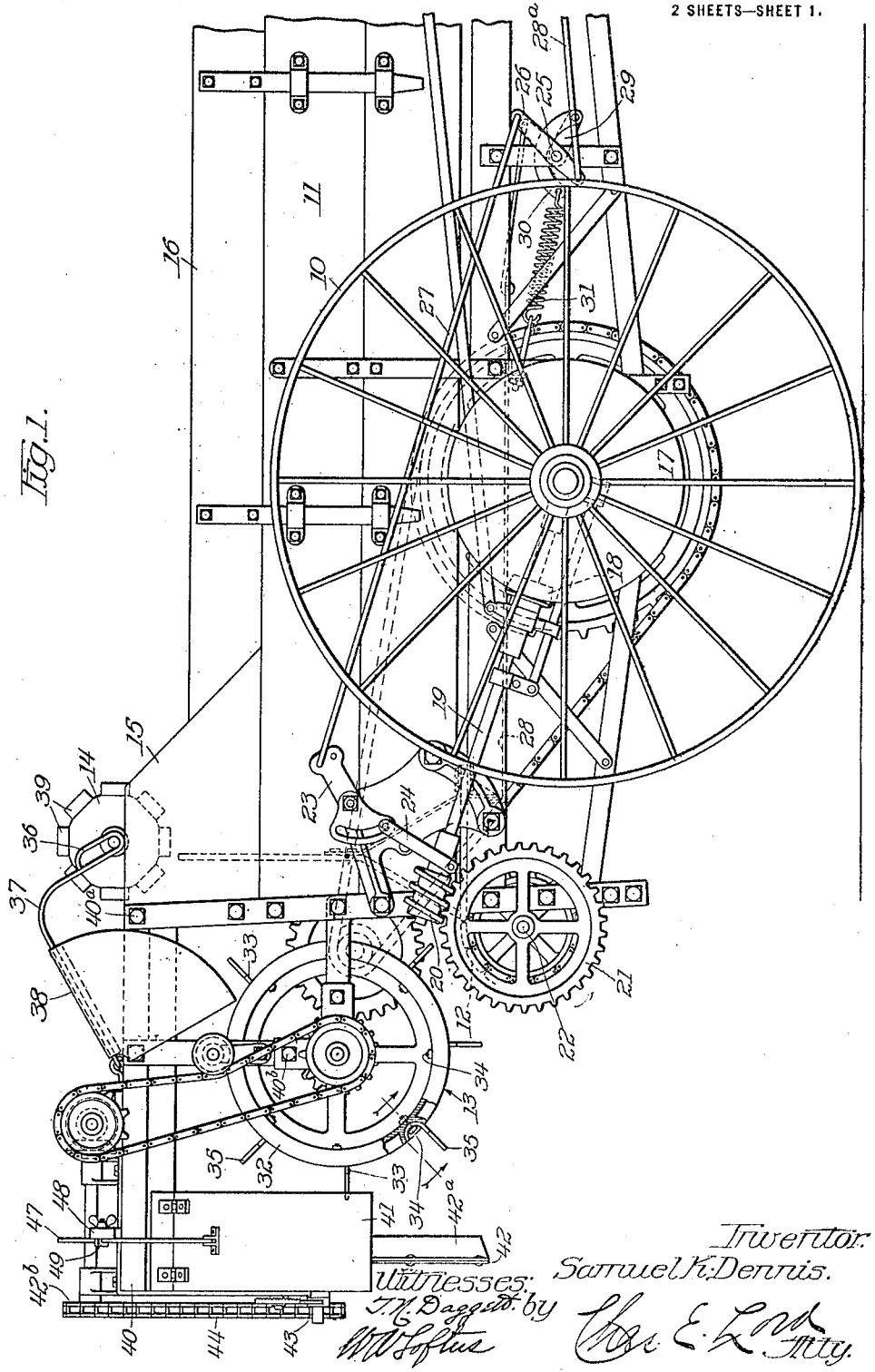

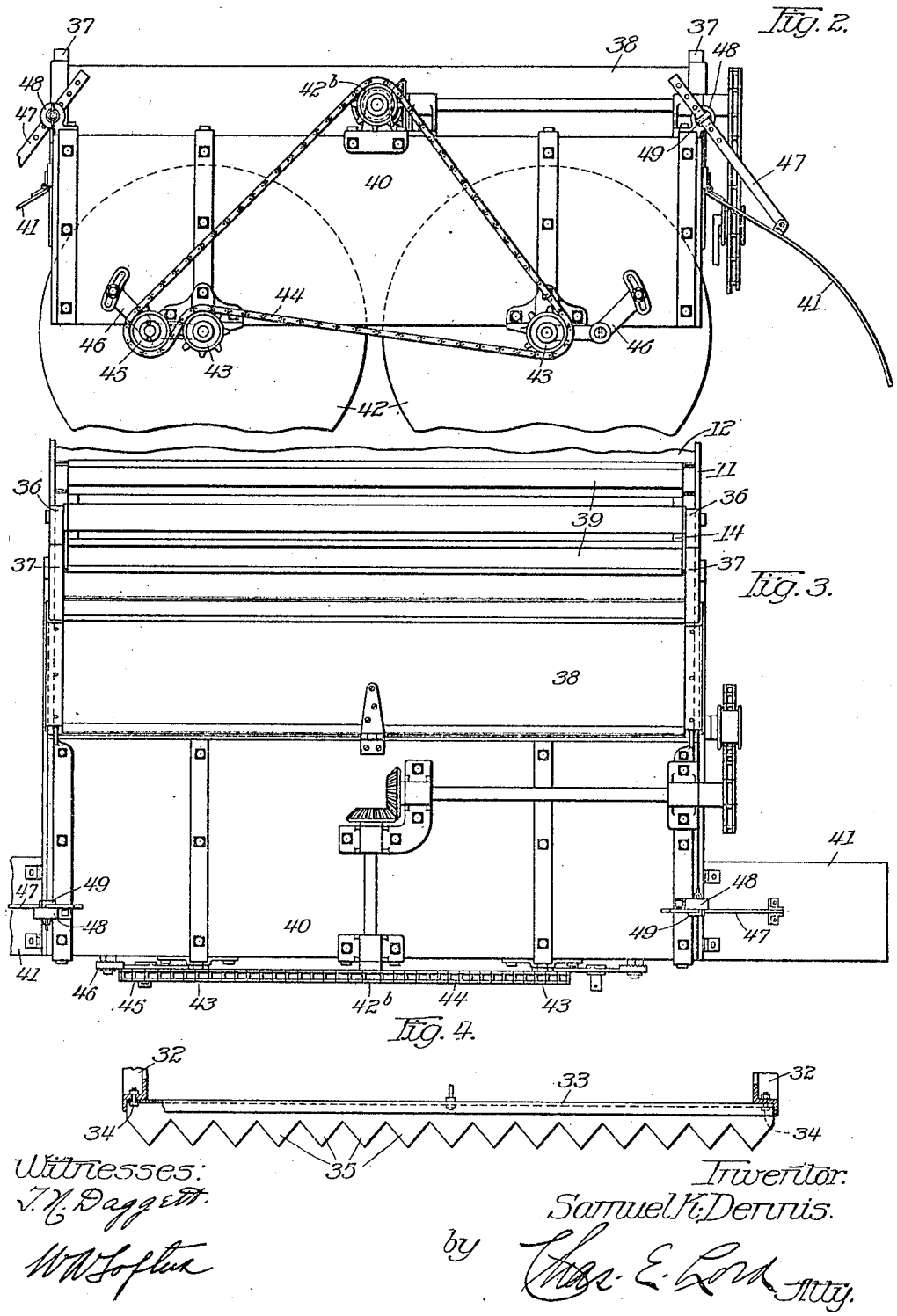

SAMUEL K. DENNIS, OF CHICAGO, ILLINOIS, ASSIGNOR, BY MESNE ASSIGNMENTS, TO INTERNATIONAL HARVESTER COMPANY, A CORPORATION OF NEW JERSEY.

FERTILIZER-DISTRIBUTER.

1,291,436. Specification of Letters Patent. Patented Jan. 14, 1919.

Application filed March 13, 1914, Serial No. 824,497. Renewed January 30, 1918. Serial No. 214,557.

*To all whom it may concern:*

Be it known that I, SAMUEL K. DENNIS, a citizen of the United States, residing at Chicago, in the county of Cook and State of Illinois, have invented certain new and useful Improvements in Fertilizer-Distributers, of which the following is a full, clear, and exact specification.

This invention relates to fertilizer distributers.

The object of my invention is to improve and simplify the construction and operation of a fertilizer distributer or manure spreader equipped with supplemental distributing means, for the purpose of increasing the width of spread.

One form which my invention may assume is exemplified in the following description and illustrated in the accompanying drawings, in which—

Figure 1 shows a side elevation of a rear portion of a fertilizer distributer embodying my invention;

Fig. 2 shows a rear elevation of a portion of the device shown in Fig. 1;

Fig. 3 shows a plan view of the device illustrated in Fig. 2; and

Fig. 4 shows a detail view of one of the toothed bars employed in my improved distributing cylinder.

The particular form of my device illustrated herein, generally speaking, comprises traction wheels 10; a receptacle 11; a traveling apron 12 for the receptacle, operatively connected to the traction wheels; an improved beater, or distributing cylinder 13, also operated by the traction wheels; a retarding cylinder 14, with its associated tailboard, mounted upon the receptacle; improved supplemental spreading means, and improved means for positively holding the apron driving gears in and out of mesh, all coöperating to effect the objects of my invention.

The receptacle 11 is preferably of the form in which rear top pieces 15 are employed, and coacting therewith in a manner to bring the receptacle to a greater height are detachable side board members 16. The traveling apron 12 is of the reverse type as distinguished from the endless type. The driving mechanism for the apron comprises a driving disk 17 mounted upon the axle of the traction wheels; a pinion 18 operated thereby and movable in a radial direction upon the driving disk to obtain various speeds, and a shaft 19 for the pinion 18, extending rearwardly and provided at its end with a screw 20 adapted to mesh with a gear 21 on the apron operating shaft 22. The end of the shaft 19 carrying the screw is movable toward and away from the gear 21 by means of a cam lever 23 and a link connection 24. The cam lever is operated by a transverse shaft 25 connected thereto by means of a crank arm 26 and a connecting rod 27. All of the parts just described will, of course, vary in different machines, but the movable gear for throwing the apron in and out of motion will be found to be generally employed in machines of this class. The means for operating the transverse shaft 25 to throw the gears in and out of mesh also varies in different machines, and in the present instance I have shown a longitudinally movable rod 28 connected to a crank arm on the transverse shaft and designed to be moved rearwardly for the purpose of lifting the screw 20 to its unmeshed position. A hand lever (not shown), conveniently located with respect to the operator's seat, and connected to the link member 28ª, is preferably employed for throwing the screw into its meshing position.

With the parts just described in operation, the apron, upon nearing its rearward limit of movement, will engage the rod 28 and slide it rearwardly, thus rocking the transverse shaft 25 sufficiently to cause disengagement of the screw 20 with the gear 21. The machine will continue its course over the field when the receptacle has been emptied and jolting movements will be imparted to the suspended shaft 19, which, in extreme cases, will cause reëngagement of the screw 20 and gear 21 unless the shaft 19 be positively held in its upward position. The engagement of the apron with the slide rod 28 is not sufficiently positive for this purpose, and obviously where a hand lever is employed in connection with the automatic disengaging means, the ordinary sector and detent mechanism must be eliminated. It will thus be seen that, with the sector and detent removed, no means is provided for positively holding the gear and screw in engagement, and under such conditions the screw is susceptible to movement to its engaging position by the jolting movements received in operation.

To overcome these objections I have provided upon the transverse shaft 25 a rigid crank arm 29 having pivoted to its outer end an upwardly curved link 30 extending over the transverse shaft and connected in turn to a rearwardly extending contractible coil spring 31, which spring is anchored to any convenient portion of the receptacle. These parts are so arranged that when the gears 20 and 21 are in mesh the crank arm 29 will be directed forwardly and a slight distance below the line of pull exerted by the spring, the link 30 being sufficiently curved to permit this position of the crank arm. The spring 31, through the transverse shaft, operates to positively hold the gears in mesh. The apron, upon engaging the sliding rod 28, will cause the transverse shaft to be rocked, and thus the crank arm 29 will be moved upwardly past its dead center, whereupon the spring will operate to complete the movement of the shaft and thus hold the screw 20 in its disengaged position in a positive manner.

My improved beater is mounted in the usual way at the rear of the receptacle and is operated in any suitable manner, preferably from the traction wheels. The beater comprises cylinder heads 32 and a plurality of longitudinally arranged toothed bars 33, which bars are preferably curved at their inner ends and rigidly secured to the end pieces by means of bolts 34 or the like. One of these toothed bars is shown in Fig. 4, and it will be seen that its outer edge is serrated to form a plurality of V-shaped teeth 35. Numerous tests have disclosed the fact that such teeth will operate to break up the fertilizer in a more thorough and satisfactory manner than is possible with other forms of teeth and, furthermore, the shape of these teeth prevents straw which is contained in the fertilizer from wrapping about said teeth, as it often does in the case of the spiked teeth generally employed in distributing cylinders. This beater is particularly adapted for use in connection with supplemental distributers, for the reason that it is necessary to divide the fertilizer into small particles in order to secure a maximum width of distribution on the part of the supplemental members. Moreover, this form of beater is decidedly inexpensive in construction, as it is possible, from a flat metal bar of the desired length and approximately eight inches in width, to construct two of the toothed sections by the simple operation of making a properly shaped saw-toothed cut through the middle portion thereof. With a beater of this type the tail rakes usually employed to assist in separating and breaking up the fertilizer may be dispensed with.

For the tail rake I have substituted the floating retarding cylinder 14, which, it will be seen, is journaled in slotted bearings 36 formed in the frame bars 37 of an upwardly slanting rearwardly hinged tail board 38, the latter being movable for the purpose of preventing choking of the distributing cylinder. The retarding cylinder is provided with projecting slats 39 adapted to engage with the manure. The travel of the manure will thus rotate the retarding cylinder; but the friction to be overcome in so doing will be sufficient to prevent excessive delivery to the distributing cylinder. The downward movement of the retarding cylinder is limited by the rear top boards, upon which it normally rests. The free vertical movement of the cylinder obviously permits it to rise always to the top of the load and prevent escape of the contents. This facility of the retarding cylinder permits of the employment of the side boards 16, the receptacle being thus made to accommodate loads of increased capacity, and the retarding cylinder and tail board will operate to prevent loss of the contents when a pile of fertilizer accumulates at the rear and near the distributing cylinder.

The supplemental distributing means is preferably constructed detachable from the receptacle and comprises a rearwardly extending hood 40, on either side of which is a hinged wing member 41; vertically arranged oppositely rotating disks or scatterers 42 below the hood in position to receive the material discharged by the cylinder, and driving mechanism for said disks. Each of the disks is provided on its inner face with radial vanes or strips 42$^a$ to engage with the manure and scatter it in the desired direction when they are rotated. For driving these disks I employ a sprocket gear 42$^b$, preferably arranged on the top of the hood and operatively connected with the beater. Sprocket gears 43 are provided for the disks and these are operated by means of a sprocket chain 44 connected with the driving gear 42$^b$. To obtain opposite rotary movements for the disks I employ an idler sprocket gear 45 carried upon an adjustable arm 46 adjacent to one of the gears 43. By means of the idler gear 45 the driving chain can be passed over the adjacent sprocket gear 43 in a manner to engage teeth opposite from what it otherwise would engage, and by reason of this the disk is given a rotary movement opposite to that of the other disk. The idler gear by its arm 46 being adjustably movable, can be employed as a chain tightener. With the chain arranged in the manner in which it is shown in Fig. 2, the disks will be operated to give upwardly directed movement to their inner peripheries and thus the fertilizer will be thrown to the outer sides a considerable distance. However, for mulching purposes and under other similar conditions it is desirable that the fertilizer be distributed in a narrow heavy row, and by changing the idler gear 45 to the opposite disk, and rearranging the driving chain thereon, a motion will be imparted to the disks which will drive their outer peripheries in an upwardly direction, and thus the fertilizer is spread in the desired manner. The hood 40, it will be noted, is attached to the receptacle at each side by means of two bolts 40$^a$ and 40$^b$, the former being secured in the top board and the latter in the bearing of the distributing cylinder, and consequently removal of the supplemental distributing mechanism can be effected quickly.

The side wings 41 are rendered readily and easily adjustable by the employment of a bar 47 pivoted to the outer surface of each of the wings and connected to a lug 48 fixed to the hood, and adjustably received therein by means of a loop 49 carried on said lug. The wings, it will be seen, are of comparatively simple construction, having no side or end portions, and are slightly curved outwardly.

While I have shown and described but one form of my invention, it is to be understood, nevertheless, that it is susceptible of modification and that changes in the details of construction may be resorted to without departing from the spirit thereof, as disclosed in the appended claims.

What I claim as new, and desire to secure by Letters Patent, is:

1. In a fertilizer distributer, a receptacle, distributing mechanism, a movably mounted support, and a retarding cylinder associated with said distributing mechanism and mounted in said support for floating movement therein.

2. In a fertilizer distributer, supplemental distributers, a hood for said supplemental distributers, side wings for said hood comprising curved strips hinged to said hood, and means for adjustably holding said wings in any desired position.

3. In a fertilizer distributer, a receptacle, a movable bottom therefor, a beater in said receptacle, a hood adjacent to said beater, supplemental distributers, a tail-board hinged on said receptacle near the front of said hood and normally extended upwardly and forwardly, and a retarding cylinder carried by said tail-board.

4. In a fertilizer distributer, a receptacle, a movable bottom therefor, a beater in said receptacle, a hinged tail-board over said beater, and a retarding cylinder carried by said tail-board and movable independently thereof.

5. In a fertilizer distributer, a receptacle, distributing mechanism, a support having elongated openings, and a retarding member associated with the distributing mechanism and mounted in the openings of said support for revoluble and floating movement therein.

6. In a fertilizer distributer, a receptacle, distributing mechanism, a support having elongated openings, and a substantially cylindrical retarding member associated with said distributing mechanism and mounted in the openings of said support for revoluble and floating movement therein.

7. In a fertilizer distributer, a receptacle, distributing mechanism, a shield pivotally mounted over the distributing mechanism and extending forwardly, and a revoluble retarding member supported by said shield.

8. In a fertilizer distributer, a receptacle, distributing mechanism, a shield member pivotally mounted over said distributing mechanism and extending forwardly, and a retarding roller mounted in said shield member for floating movement therein.

In testimony whereof I affix my signature, in the presence of two witnesses.

SAMUEL K. DENNIS.

Witnesses:
EVAN EVANS,
C. H. MANGOLD.